US006573358B2

(12) United States Patent
Michels et al.

(10) Patent No.: US 6,573,358 B2
(45) Date of Patent: Jun. 3, 2003

(54) PROCESS FOR THE PREPARATION OF SUPERABSORBENT POLYMERS FROM POLYACRYLONITRILE PRECIPITATION POLYMERS

(75) Inventors: Gisbert Michels, Leverkusen (DE); Günter Sackmann, Leverkusen (DE); Klaus Struss, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/835,665

(22) Filed: Apr. 16, 2001

(65) Prior Publication Data

US 2001/0047060 A1 Nov. 29, 2001

(30) Foreign Application Priority Data

Apr. 20, 2000 (DE) .......................................... 100 19 757

(51) Int. Cl.[7] .......................... C08F 6/02; C08F 120/44; H02G 15/08
(52) U.S. Cl. ....................... 528/489; 528/490; 528/491; 521/142; 523/105; 523/173; 525/329.1
(58) Field of Search ....................... 525/329.1; 528/489, 528/491; 521/142; 523/105, 173

(56) References Cited

U.S. PATENT DOCUMENTS

| 4,337,328 | A | | 6/1982 | Holst et al. .................. 525/336 |
| 5,356,985 | A | | 10/1994 | Sackmann et al. .......... 524/460 |
| 5,393,845 | A | | 2/1995 | Korte et al. ................. 525/369 |
| 5,496,890 | A | | 3/1996 | Sackmann et al. ....... 525/329.1 |
| 5,567,779 | A | | 10/1996 | Sackmann et al. ....... 525/329.1 |
| 5,635,569 | A | | 6/1997 | Sackmann et al. .......... 525/367 |
| 5,728,774 | A | | 3/1998 | Sackmann et al. .......... 525/196 |
| 6,080,797 | A | * | 6/2000 | Nishida |
| 6,156,848 | A | | 12/2000 | Sackmann et al. ....... 525/329.1 |
| 6,288,158 | B1 | | 9/2001 | Schapowalov et al. ..... 524/493 |

FOREIGN PATENT DOCUMENTS

| EP | 067362 | 12/1982 |
| EP | 331848 | 9/1989 |
| EP | 371258 | 6/1990 |

* cited by examiner

Primary Examiner—Tae H. Yoon
(74) Attorney, Agent, or Firm—Joseph C. Gil; Aron Preis

(57) ABSTRACT

A process for the preparation of superabsorbers is disclosed. The process entails subjecting a polyacrylonitrile precipitation polymer alkaline hydrolysis to obtain a hydrolysis product. The hydrolysate that may optionally be neutralized is dried and ground and optionally modified by crosslinking of its surface. The inventive superabsorber is suitable for the preparation of nappies, incontinence articles, water-storage materials and electric cable coverings.

2 Claims, No Drawings

PROCESS FOR THE PREPARATION OF SUPERABSORBENT POLYMERS FROM POLYACRYLONITRILE PRECIPITATION POLYMERS

The invention relates to a process for the preparation of superabsorbent polymers (SAP) by alkaline hydrolysis of polyacrylonitrile precipitation polymers (PAN precipitation polymer).

Superabsorbent polymers are known and are used mainly in the manufacture of nappies and incontinence articles, but also as water-storage materials in agriculture and in the covering of electric cables. In general, those superabsorbent polymers are wide-mesh crosslinked, water-insoluble polymers or copolymers based on alkali metal salts of polyacrylic acid or copolymers of alkali metal salts of acrylic acid and acrylamide, which are obtained by the free-radical initiated copolymerization of acrylic acid and polyfunctional monomers, such as divinylbenzene, ethylene glycol dimethacrylate, ethylene glycol diallyl ether, butanediol diacrylate, hexanediol dimethacrylate, polyglycol diacrylate, trimethylolpropane diacrylate, allyl acrylate, diallyl acrylamide, trisallylamine, diallyl ether, methylenebisacrylamide and N-methylolacrylamide. Owing to their structure, such polymers are capable, by swelling and the formation of hydrogels, of absorbing large quantities of water and aqueous solutions and of retaining them even under pressure.

Processes for the preparation of SAPs are known from DE-A 44 06 951, DE-A 44 29 318, DE-A 196 00 163, DE-A 196 46 856 and EP-A 936 223; a common feature of all those specifications is that superabsorbent polymers are formed by alkaline hydrolysis of finely particulate polyacrylonitrile emulsions (PAN emulsions).

The above-mentioned processes use PAN emulsions which can be prepared only by using a particular emulsifier, which is described in DE-A 42 33 026; without the use of that emulsifier, it has hitherto scarcely been possible to prepare PAN emulsions economically. However, the use of that particular emulsifier is disadvantageous for economic and qualitative reasons. The quality of the superabsorbers is impaired because the emulsifier is water-soluble or water-dispersible.

The obvious solution, namely to use PAN precipitation polymers as the raw material, is not possible, as DE-A 44 06 951 and DE-A 44 29 318 teach:

"The acid or alkaline hydrolysis of polyacrylonitrile also yields polymers having carboxyl or carboxylate groups. Those polymers are generally water-soluble (and therefore not swellable), because the polyacrylonitrile used as starting material and obtained by precipitation polymerisation has a too low molecular weight."

Accordingly, the object of the invention was to find a raw material based on polyacrylonitrile instead of on finely particulate PAN emulsions, which raw material can be prepared without the use of the above-mentioned particular emulsifiers according to DE-A 42 33 026 and which, after alkaline hydrolysis and, optionally, further steps, has outstanding SAP properties.

The invention provides a process for the preparation of SAPs, which process comprises the following subsidiary steps:

a) preparation of the PAN precipitation polymers, preferably uncrosslinked or crosslinked homopolymers of acrylonitrile,
b) alkaline hydrolysis of the PAN precipitation polymers, preferably in self-cleaning reactors suitable for high-viscosity media, to obtain a hydrolysate (=hydrolysis product)
c) optionally, neutralisation of the hydrolysate if necessary and desired by:
 1. addition of acid to the hydrolysis product, or
 2. addition of the hydrolysis product to a water/acid mixture, or
 3. addition of the hydrolysis product to an alcohol/water/acid
d) drying of the water-containing, gel-like product,
e) grinding the dried product obtained in d) to the desired particle size,
f) surface modification of the granular SAP.

The purpose of the optional neutralization step C) is the adjustment of the pH value of the water-containing, gel-like product to a level smaller than 7.

Accordingly, in the present invention, high molecular weight PAN precipitation polymers are used instead of PAN emulsions.

It is already known from DE-A 196 00 163 that SAPs can be prepared by hydrolysis of PAN emulsions of fine particle size. It is described that superabsorbent polymers from PAN emulsions can be prepared in a continuous and reproducible manner from concentrated emulsions if self-cleaning reactors having a volume sufficient for a dwell time of from 0.5 to 2 hours are used for the alkaline hydrolysis of the PAN emulsion.

It is also described that suitable devices for the preparation of superabsorbent polymers by hydrolysis of PAN emulsions are especially those that permit relatively long residence times with sufficiently good mixing and good heat transfer with the simultaneous removal of the gaseous ammonia that forms during the hydrolysis. Especially suitable are so-called "List reactors" (manufacturer: List AG, CH-4422 Arisdorf, Switzerland) having a free volume of up to 16.5 $m^3$, which are constructed as single-shaft or twin-shaft devices and have special mixing and scraping members both on the shaft and in the reactor housing. Such reactors may also be connected in series, as a result of which a high degree of flexibility can be achieved.

According to DE-A 196 00 163, when the hydrolysis is complete the reaction mixture may be continuously introduced directly from the List reactor into a precipitation reactor equipped with a high-speed stirrer and containing a low-boiling alcohol, for example methanol or ethanol. The superabsorbent polymer precipitates thereby in the form of a fine, readily filterable powder. Drying and grinding to the desired particle size yield the finished superabsorber.

It is also described that, in order to neutralize the unconsumed alkali metal hydroxide or to adjust the pH value of the end product, acid must be added in order to maintain the pH value of $\leq 7$ required for use in hygiene articles, for example babies' nappies or incontinence articles for adults.

However, it is in principle also possible, as described in DE-A 19 646 856, to carry out the hydrolysis in a water/alcohol mixture in stirred containers.

The present invention also provides superabsorbers prepared by the process according to the invention.

The invention relates also to the use of the superabsorbers according to the invention in the manufacture of nappies, incontinence articles, water-storage materials and electric cable coverings.

The invention further provides nappies, incontinence articles, water-storage materials and electric cable coverings manufactured by the process according to the invention.

Suitable high molecular weight PAN precipitation polymers according to subsidiary step a) may be prepared by methods known in the art; see in this connection, for example, Houben-Weyl, Methoden der organischen Chemie, E20, p. 1208–1216, Georg Thieme Verlag, Stuttgart. The molecular weights (weight-average) of the uncrosslinked PAN precipitation polymers are from $5*10^5$ to $1*10^7$ g/mol, and the Staudinger indices, measured in dimethylformamide with the addition of 1 g/liter of LiBr, are greater than 2 dl/g, preferably greater than 4 dl/g. Preferred PAN precipitation polymers are polyacrylonitriles; both uncrosslinked and crosslinked homopolymers of acrylonitrile are preferred. Crosslinked PAN precipitation polymers contain, incorporated by polymerization, polyfunctional monomers, as described, for example, in DE-A 42 33 026 (U.S. Pat. No. 5,356,985 incorporated herein by reference), or divinyl ethers, such as, for example, diethylene glycol divinyl ether, ethylene glycol divinyl ether, butanediol divinyl ether, which list does not constitute a limitation, of from 0.01 to 4.0 wt. %, based on the total amount of monomers.

According to subsidiary step b), the liquid starting materials (PAN precipitation polymers dispersed in water, and aqueous alkali metal hydroxide solution) are mixed, and the hydrolysis is carried out in self-cleaning reactors suitable for high-viscosity media (HV reactors). In the hydrolysis, high-viscosity gels having a solids content of from 10 to 70 wt. % are formed. Suitable HV reactors have a good mixing and kneading action for the high-viscosity gel that forms, good heat transfer, and permit removal of the ammonia that forms in the hydrolysis. Especially suitable HV reactors are those from List AG, CH-4422 Arisdorf, Switzerland, which are constructed as single- or twin-shaft devices and have mixing and scraping members both on the shaft and in the reactor housing.

After the starting materials have been mixed, the hydrolysis may be carried out in a batch process, in a semi-continuous process by the metering in of one or both starting materials, or in a continuous process. In the case of a continuous process it is also possible to meter in the starting materials at the beginning of the process or in part later in the process. It is possible to use one or more HV reactors connected in series. Mixing of the starting materials may be carried out in the HV reactor or apparatuses located upstream thereof, such as, for example, pipes or static mixers, or alternatively in an HV reactor located upstream, the principal function of which is mixing, or in screw-type kneading machines.

In the hydrolysis of the PAN precipitation polymers with aqueous alkali metal hydroxide solutions, the molar ratio of the nitrile groups of the polymer to the alkali metal hydroxide is from 1:1 to 1:0.05, preferably from 1:0.9 to 1:0.1, particularly preferably from 1:0.7 to 1:0.3. Alkali metal hydroxides are preferably NaOH or KOH or mixtures thereof. The hydrolysis is carried out at from 80 to 200° C., preferably from above 100 to 160° C., under pressure higher than atmospheric pressure. The reaction times are from 0.01 to 10 hours. The gaseous ammonia that forms in the hydrolysis may be removed from the reactor and dissolved in water or condensed at low temperatures. In order to remove the ammonia from the hydrolysis product as completely as possible, it is advantageous to evaporate off water from the reactor in addition to ammonia. The resulting loss of water can be compensated by the metered addition of water (in liquid or in vapor form). However, it is also possible not to compensate the resulting loss, so that the solids content of the hydrolysis product increases accordingly.

In the hydrolysis there form partially hydrolyzed polymers in which from 30 to 80 mol % of the nitrile groups of the PAN polymer have been converted into carboxylate groups and from 20 to 70 mol % into carboxamide groups and from 0 to 20 mol % of the nitrile groups remain unchanged. The pH value of the hydrolysis products, measured as a 0.1 wt. % solution in 0.9 wt. % NaCl solution, is in the region of 8.0, preferably from 7.5 to 7.1.

According to subsidiary step c), in order to adjust the pH to a value in the region of 7.0, preferably from 6.5 to 5.5, measured as a 0.1 wt. % solution in 0.9 wt. % NaCl solution, an acid is optionally added to the hydrolysis product (according to c1.)) when the hydrolysis is complete, or the hydrolysis product is passed for a short time into a water/acid mixture (according to c2.)), or the hydrolysis product is passed for a short time into an alcohol/water/acid mixture (according to c3.)). Suitable acids include mineral acids, such as, for example, hydrochloric acid, sulfuric acid, phosphoric acid, nitric acid, carboxylic acids, for example formic acid, acetic acid, propionic acid, adipic acid, lactic acid, citric acid, polymeric acids, for example polyacrylic acid, polyacrylic acid copolymers, polystyrenesulfonic acid, and mixtures of the above-mentioned acids. Polymeric acids may be used in crosslinked or uncrosslinked form.

The amount of acid added in subsidiary step c1.) is dependent on the one hand on the pH value desired for the particular application and on the other hand on the acid strength of the acid. Accordingly, the amount of acid added is from 0.1 to 20 wt. %, preferably from 0.1 to 10 wt. %, based on the dry weight of the hydrolysis product. The alkali metal salts formed by the addition of the acid remain in the product. The acid may be mixed with the high-viscosity hydrolysis product continuously or discontinuously in suitable mixers, such as, for example, static mixers, screw-type kneading machines, kneaders.

The amount of acid entailed in subsidiary step c2.) or c3.) is dependent on the one hand on the pH value desired for the particular application and on the other hand on the acid strength of the acid. Accordingly, the amount of acid added is from 0.1 to 20 wt. %, preferably from 0.1 to 10 wt. %, based on the dry weight of the hydrolysis product. The acid is dissolved in from 1.0 to 100 times the amount of water or alcohol/water, preferably from 1.5 to 30 times the amount of water or alcohol/water, based on the weight of the SAP gel to be neutralized. The residence time of the hydrolysate in the water/acid mixture or alcohol/water/-acid mixture is from 5 seconds to 30 minutes, preferably from 10 seconds to 5 minutes. Neutralization of the hydrolysis product according to subsidiary step c2.) or c3.) may be carried out both batchwise and continuously.

The water-containing, gel-like product obtained according to subsidiary step c) is dried according to subsidiary step d). Suitable methods of drying are described according to the prior art in "Modern Superabsorbent Polymer Technology", Eds. F. L. Buchholz, A. T. Graham, Wiley-VCH, New York, 1998, ISBN 0-471-19411-5, Chapter 3.2.4.2. Post-Reactor Gel Preparation, p. 85–87 and 3.2.5. Drying, p. 87–93 and the literature cited therein all of which are incorporated by reference herein.

In subsidiary step e), the dried product is ground and sized following methods that are known in the art see in this connection: "Modern Superabsorbent Polymer Technology", Eds. F. L. Buchholz, A. T. Graham, Wiley-VCH, New York, 1998, ISBN 0-471-19411-5, Chapter 3.2.6. Handling of the Dried Material: Particle Sizing, p. 93–95. The particle-size distribution of the ground and sized SAP is to be in the range of from 100 to 1000 $\mu$m, preferably from 150 to 850 $\mu$m.

Surface modification, such as crosslinking, of the granular SAP's is indicated in the instances where the material is to be used in hygiene articles, such as babies' diapers. Gel blocking which leads to low transport rate of the absorbed liquid may be avoided and better absorptive properties, including AUL, including absorption under high pressure load of, for example 0.7 psi, are attained by such modification by subsidiary step f).

There are suitable for that purpose known modifying agents, such as, for example, di- and polyols, for example ethylene glycol, 1,2-propanediol, glycerol, also ethylene carbonate, diglycidyl compounds, such as, for example, ethylene glycol diglycidyl ether, or di- or polyisocyanates, or mixtures thereof.

The SAPs obtainable by the process according to the invention are excellently suitable for use in the manufacture of hygiene articles, such as, for example, babies' nappies, incontinence articles for adults and feminine hygiene, for the covering of electric cables, for use as water-storage materials in agriculture, and for the packaging sector of goods that are at risk of leaking.

For the characterization of the products, the retention (according to EDANA 441.0-96) and AUL at 0.3 psi (according to EDANA 442.0-96) are measured.

EXAMPLE A

Preparation of the High Molecular Weight PAN Precipitation Polymers

The preparation of the PAN precipitation polymer was carried out in a cylindric reactor having a volume of 4 liters, 150 rpm helical stirrer, at 60° C. The following metering solutions were used (all amounts in [g]):

| Solution I: | |
|---|---|
| acrylonitrile | 591.5 |
| diethylene glycol divinyl ether | 0.885 |
| Solution II: | |
| water (deionized) | 717.6 |
| $FeSO_4 \cdot 7H_2O$ | 62.4 |
| (0.1% solution) | |
| $MgSO_4 \cdot 7H_2O$ | 39.0 |
| Solution III: | |
| water (deionized) | 773.5 |
| $H_2SO_4$ | 19.5 |
| Na persulfate | 0.36 |
| Solution IV: | |
| water (deionized) | 778.0 |
| Na disulfite | 0.73 |

15 wt. % of solutions I–IV were introduced in succession. When an internal temperature of 60° C. had been reached, the remainder of the solutions was metered in in the course of 6 hours; stirring was then carried out for 0.5 hour. After filtration, washing with water and drying, the PAN precipitation polymer was obtained in a yield of 282 g. For the hydrolysis, the material was dispersed in the required amount of water.

Example 1

The alkaline hydrolysis of the PAN precipitation polymer was carried out in an HV reactor from List (List-CRP 2.5 batch reactor: twin-shaft, with convey screw, reaction volume 2.5 liters).

The starting materials (PAN precipitation polymer dispersed in water, prepared according to Example A in the indicated amounts of sodium hydroxide solution, deionized water) were introduced into the reactor at room temperature and mixed at a constant speed of 20 rpm. The reactor was heated stepwise (approximately 100° C.) and the resulting ammonia/water mixture was relieved via a needle valve into a sulfuric acid trap. When the evolution of ammonia was complete, approximately 500 g of water were distilled off and simultaneously replaced by fresh water in order to lower the ammonia content in the gel-like SAP. After cooling to <60° C., the viscous, gel-like, slightly yellow to colorless product was discharged from the convey screw via a nozzle plate having 3 mm holes (hydrolysis conditions: see Table 1). The solids content was determined.

The gel was dried in a laboratory drying cabinet at from 110 to 115° C., ground by means of a laboratory mill and the comminuted particles fractionated to a particle size range of from 100 to 800 μm. The surface modification was carried out with a solution of glycerol, 2-propanediol and water in a ratio of 1:1:1. To that end, 100 parts of SAP powder were placed in a glass beaker, sprayed and mixed with 6 parts of the above-mentioned solution, and then reacted for 2 hours at 215° C. in a drying cabinet (see Table 2).

Example 2 (Comparison Example, Not According to the Invention)

The alkaline hydrolysis of the PAN emulsions was carried out in an HV reactor from List (List-CRP 2.5 batch reactor: twin-shaft, with delivery screw, reaction volume 2.5 liters).

The PAN emulsion was prepared according to DE-A 42 33 026, Example 8 (U.S. Pat. No. 5,356,985). The emulsion in question is an uncrosslinked polyacrylonitrile homopolymer, and the amount of polymeric emulsifier used, in contrast to DE-A 42 33 026, Example 8, was only 2.5 wt. %, based on polyacrylonitrile, and the solids content of the emulsion was 32.68 wt. %.

The starting materials (PAN emulsion, sodium hydroxide solution, deionized water) were introduced into the reactor at room temperature and mixed at a constant speed of 20 rpm. The reactor was heated stepwise (approximately 100° C.) and the resulting ammonia/water mixture was relieved via a needle valve into a sulfuric acid trap. When the evolution of ammonia was complete, approximately 500 g of water were distilled off and simultaneously replaced by fresh water in order to lower the ammonia content in the gel-like SAP. After cooling to <60° C., the viscous, gel-like, slightly yellow to colorless product was discharged from the convey screw via a nozzle plate having 3 mm holes (hydrolysis conditions: see Table 1). The solids content was determined.

The gel was dried in a laboratory drying cabinet at from 110 to 115° C., ground by means of a laboratory mill and fractionated to a particle size of from 100 to 800 μm. The surface modification was carried out with a solution of glycerol, 2-propanediol and water in a ratio of 1:1:1. To that end, 100 parts of SAP powder were placed in a glass beaker, sprayed and mixed with 6 parts of the above-mentioned solution, and then reacted for 2 hours at 215° C. in a drying cabinet (see Table 2).

TABLE 1

Hydrolysis conditions in the List reactor

| Example | PAN precipitation polymer A [g] | PAN emulsion (32.68 wt. %) [g] | NaOH, 45% [g] | Deionised water [g] | Hydrolysis temperature [° C.] | Duration of hydrolysis [hh:mm] | Solids content [wt. %] |
|---|---|---|---|---|---|---|---|
| 1 | 495.4 | — | 409.6 | 1589.8 | 100 | 4:00 | 36.22 |
| 2 | — | 1652.4 | 452.3 | 295.3 | 100 | 4:00 | 43.3 |

TABLE 2

Surface modification

| Example | Retention | AUL 0.3 psi |
|---|---|---|
| 1 | 28.8 | 30.1 |
| 2 | 25.0 | 27.9 |

What is claimed is:

1. A process for the preparation of a superabsorber comprising (i) obtaining a polyacrylonitrile precipitation polymer and (ii) subjecting said polymer to alkaline hydrolysis to obtain a hydrolysis product and (iii) neutralizing the hydrolysis product by adding it to an alcohol/water/acid mixture.

2. The process of claim 1 further comprising drying the neutralized hydrolysis product to obtain a dried product and grinding the dried product.

* * * * *